(12) United States Patent
Willig et al.

(10) Patent No.: US 7,523,663 B2
(45) Date of Patent: Apr. 28, 2009

(54) MICROMECHANICAL ROTATION RATE SENSOR HAVING ERROR SUPPRESSION

(75) Inventors: Rainer Willig, Tamm (DE); Buckhard Kuhlmann, Eningen (DE); Udo-Martin Gomez, Leonberg (DE); Wolfram Bauer, Tuebingen (DE); Johannes Classen, Reutlingen (DE); Christoph Lang, Palo Alto, CA (US); Michael Veith, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 11/317,819

(22) Filed: Dec. 22, 2005

(65) Prior Publication Data
US 2006/0191338 A1 Aug. 31, 2006

(30) Foreign Application Priority Data
Dec. 22, 2004 (DE) ........................ 10 2004 061 804

(51) Int. Cl.
*G01P 15/08* (2006.01)
(52) U.S. Cl. ................................. 73/504.12; 73/514.02
(58) Field of Classification Search .............. 73/514.12, 73/514.2, 504.12
See application file for complete search history.

(56) References Cited

U.S. PATENT DOCUMENTS 5,672,949 A 9/1997 Ward
6,067,858 A 5/2000 Clark et al.
7,047,808 B2 * 5/2006 Malvern et al. .......... 73/514.12
2004/0206176 A1 10/2004 Willig et al.

FOREIGN PATENT DOCUMENTS

DE 197 26 006 9/1998
DE 102 37 411 7/2003

* cited by examiner

*Primary Examiner*—Hezron Williams
*Assistant Examiner*—Mark Shabman
(74) *Attorney, Agent, or Firm*—Kenyon & Kenyon LLP

(57) ABSTRACT

A micromechanical rotation rate sensor has a seismic mass and driving devices which cause a driving vibration of the seismic mass in a first direction x. The rotation rate sensor has measuring devices which measure a deflection of the seismic mass in a second direction y, and generate a deflection signal. The deflection includes a measurement deflection caused by a Coriolis force and an interference deflection, the interference deflection being phase-shifted with respect to the measurement deflection by 90°. Compensation devices are provided at the seismic mass to reduce the interference deflection. Regulation devices are provided, to which the deflection signal is supplied as an input variable, which demodulate an interference deflection signal from the deflection signal, and which generate a compensation signal from the interference deflection signal, which is supplied to the compensation devices.

12 Claims, 4 Drawing Sheets

MICROMECHANICAL ROTATION RATE SENSOR HAVING ERROR SUPPRESSION

CROSS-REFERENCE TO RELATED APPLICATIONS

The present application claims priority to application Ser. No. 10 2004 061 804.6, filed in the Federal Republic of Germany on Dec. 22, 2004, which is expressly incorporated herein in its entirety by reference thereto.

FIELD OF THE INVENTION

The present invention relates to a micromechanical rotation or yaw rate sensor having a seismic mass and having a driving device which causes a driving vibration of the seismic mass in a first direction x. The rotation rate sensor has a measuring device which measures a deflection of the seismic mass in a second direction y, and generates a deflection signal. In this context, the deflection includes a measurement deflection, as a result of a Coriolis force and an interference deflection, the interference deflection being phase-shifted with respect to the measurement deflection, essentially by 90°. A compensation device is provided at the seismic mass in order to prevent the interference deflection.

BACKGROUND INFORMATION

Certain linearly vibrating vibration gyroscopes are believed to be conventional. In these rotation rate sensors, parts of the sensor structure are actively put into a vibration (primary vibration) in one direction, e.g., in a first axis (the x axis). In the case of an external rotation rate about a singular sensitive axis, Coriolis forces are exerted on the vibrating parts. These Coriolis forces (that are changeable periodically at the frequency of the primary vibration) effect vibrations of parts of the sensor structure (secondary vibration) in a second direction or second axis (the y axis) which is oriented perpendicularly to the x axis. A detection device is mounted on the sensor structure, which detects the secondary vibration (Coriolis measuring effect).

In the construction of the rotation rate sensors, in the design, by the choice of suitable symmetries, an excellent Cartesian coordinate system K=(x, y) is specified for the primary and the secondary vibration within the substrate plane. The mass distributions and the spring distributions are arranged such that the main axis systems of the mass sensors and the spring stiffness or spring constant sensors for the primary and the secondary vibrations agree exactly with K.

Furthermore, in the execution of the detection device, care is taken that, because of the operation of the sensors in the primary vibration (without external rotation rate) no signals are created at the detection device for the Coriolis effect. For this purpose, the detection device is arranged such that its designated coordinate system KD also agrees with the coordinate system of the mechanics K, that means, then, that KD=(x, y) also applies.

Consequently, in such ideal rotation rate sensors no overcoupling of the primary vibration into the detection device is created. Such an overcoupling that occurs in real rotation rate sensors is called quadrature. Consequently, quadrature signals are signals at the detection device, for the Coriolis effect, which are present even without relative motion of the sensor with respect to an external inertial system, the sensor being operated in its primary vibration.

The quadrature leads to periodic signals modulated by the frequency of the primary vibration, at the detection device, for the Coriolis effect. The reason for the appearance of the quadrature signals is that the coordinate system of the sensor element mechanics K=(x, y) does not coincide with the coordinate system of the detection device KD=(x', y'), but rather, the two systems are slightly rotated with respect to each other by an angle.

Typical causes for these generally slight rotations are, for example, asymmetries in the sensor structure caused by imperfections in the manufacturing process. These may manifest themselves by asymmetric mass distributions or even asymmetric spring stiffnesses. As a result, the main axis systems of the mass tensors and the spring stiffness tensors no longer agree with KD.

Quadrature interference signals in the case of rotation rate sensors caused by imperfections in the manufacturing process are known, and are encountered in rotation rate sensors in the most varied technologies. In this context, different methods are believed to be conventional for reducing these interference signals.

A first conventional method for suppressing the quadrature signals utilizes the different phase position of rotation rate signals and quadrature signals. The Coriolis force is proportional to the speed of the primary vibration, as opposed to which the quadrature is created proportional to the deflection of the primary vibration. Thus, there exists a phase shift of essentially 90° between the rotation rate signal and the quadrature signal. At the detection device, quadrature signals and rotation rate signals are detected as signals that are amplitude modulated by the frequency of the primary vibration. By the method of synchronous modulation or phase-sensitive amplification, as described, for example, in German Published Patent Application No. 197 26 006 and also in U.S. Pat. No. 5,672,949, the signals are first of all able to be demodulated again into the base band. In addition, the quadrature signal may be suppressed by a suitable selection of the phase position of the reference signal for the demodulation. In this method, the quadrature signal is not influenced in the sensor element itself. Furthermore, the quadrature signal also has to pass the primary signal conversion paths at the detection device, it can only be suppressed electronically relatively late in the signal path. In the case of quadrature signals that are large compared to the rotation rate range, this means drastically increased demands on the dynamic range of the first signal conversion steps, and often leads to increased sensor noise.

A second conventional method for reducing the quadrature signal is the physical balancing out of the mechanical sensor structures. In this instance, in contrast to the first method, the cause of the quadrature is directly removed by reworking the sensor elements, so that no quadrature signals occur at the detection device.

According to an additional generally conventional method, an electronic quadrature compensation is performed in capacitive micromechanical rotation rate sensors. In this connection, the suppression of the quadrature signal is achieved at the detection device for the Coriolis effect by the purposeful injection of an electrical signal into the electronic converter unit. In so doing, the magnitude of the signal is selected such that the signal generated by the quadrature exactly compensates at the detection device.

In U.S. Pat. No. 6,067,858, an additional conventional method is described for the electronic quadrature compensation in capacitive micromechanical rotation rate sensors. Different electrical potentials are applied between movable comb fingers and stationary electrodes.

In German Published Patent Application No. 102 37 411 it is described how, based on the targeted intervention of forces varying periodically with time, a reduction or avoidance of quadrature signals is achieved. To do this, electrostatic forces varying in time (dynamic) are exerted on the sensor structure because of electrode structures (compensation structures) mounted at suitable parts of the sensor structure, by the purposeful application of external electrical direct voltages.

SUMMARY

According to an example embodiment of the present invention, a micromechanical rotation rate sensor includes a seismic mass and includes a driving device which causes a driving vibration of the seismic mass in a first direction x. The rotary sensor has a measuring device which measures a deflection of the seismic mass in a second direction y, and generates a deflection signal. the deflection includes a measurement deflection, on account of a Coriolis force and of an interference deflection, the interference deflection being phase-shifted with respect to the measurement deflection essentially by 90°. A compensation device is provided at the seismic mass in order to prevent the interference deflection. In order to decrease the interference deflection, the compensation device is provided at the seismic mass. A controlling device is provided, to which the deflection signal is supplied as an input variable, which demodulates an interference deflection signal from the deflection signal, and which generates a compensation signal, from the interference deviation signal, which is supplied to the compensation device. Because of the control hereof, a compensation signal may be generated, whereby the interference deflection is reduced, by dint of the compensation device, at its place of origin, e.g., the seismic mass. Hereby, the proportion of the interference deflection of the whole deflection drops off in proportion to the measurement deflection. As a result, the requirements on the evaluation of the deflection signal may be reduced with regard to the measured value to be obtained. Particularly reduced may be the requirements on synchronous demodulation of the measured value. Moreover, it may be provided that, using the control, even changes in time of the interference signal may be able to be compensated for, for example, as a result of drift or aging of the sensor. Ageing-conditioned or temperature-conditioned interference signals caused by stress-induced voltages may be suppressed by the control circuit. The control device may be provided such that the interference deflection is controlled to tend to zero.

The control device may include an integration element. Interference signals may be suppressed by using an integral controller.

The rotary sensor may have a control which generates an additional compensation signal from adjustment information. Such a combination of the regulation with a control unifies aspects of the compensation of a change in the interference signal over the running time or service life of the sensor using a fixed adjustment during manufacturing. Because of the additional adjustment, the capture range of the regulation may be decreased, and the resolution of the regulation may be increased. The resolution may be selected so that the output noise of the sensor is not significantly increased by quantization effects of the control circuit in response to a digital arrangement of the regulation. On the other hand, the combined capture range of regulation and control is able to be implemented very large.

The regulating device may be provided such that a capture range of the regulation may be able to be adjusted as a function of the adjustment value. This may make possible a capture range adjustment of the control circuit to the operating point. Consequently, the F of the Control circuit is independent of the operating point set via the adjustment.

Furthermore, there may come about a reduction in the requirements on the size of the maximum interference signal of the mechanical sensor element, because this interference signal, using the regulation hereof, may be simply compensated by a suitably selected F. This may decrease the accuracy requirements and consequently the manufacturing costs for the mechanical sensor element.

The requirements on the modulation range of the evaluation electronics of the sensor may be reduced, because the control circuit suppresses the interference deflection in the sensor element, and thus, the deflection to be evaluated, for the most part, only includes the measurement deflection.

According to an example embodiment of the present invention, a micromechanical rotation rate sensor includes: a seismic mass; at least one driving device adapted to effect a driving vibration of the seismic mass in a first direction; at least one measurement device adapted to measure a deflection of the seismic mass in a second direction and to generate a deflection signal, the deflection including a measurement deflection caused by a Coriolis force and an interference deflection, the interference deflection phase-shifted with respect to the measurement deflection substantially by 90°; at least one compensation device adapted to decrease the interference deflection and which engages with the seismic mass; and at least one regulation device, the deflection signal supplied to the regulation device as an input variable, the regulation device adapted to demodulate an interference deflection signal from the deflection signal and to generate a compensation signal from the interference deflection signal supplied to the compensation device.

The regulation device may be adapted to regulate the interference deflection tending to zero.

The regulation device may include an integration element.

The micromechanical rotation rate sensor may include a control adapted to generate an additional compensation signal from adjustment value.

The regulation device may be adapted to set a capture range of the regulation as a function of the adjustment value.

According to an example embodiment of the present invention, a micromechanical rotation rate sensor includes: a seismic mass; driving means for effecting a driving vibration of the seismic mass in a first direction; measuring means for measuring a deflection of the seismic mass in a second direction and for generating a deflection signal, the deflection including a measurement deflection caused by a Coriolis force and an interference deflection, the interference deflection phase-shifted with respect to the measurement deflection substantially by 90°; compensating means for decreasing the interference deflection and which engage with the seismic mass; and regulating means, the deflection signal supplied to the regulating means as an input variable, the regulation means for demodulating an interference deflection signal from the deflection signal and for generating a compensation signal from the interference deflection signal supplied to the compensating means.

Exemplary embodiments of the present invention are described in greater detail below with reference to the appended Figures.

DETAILED DESCRIPTION

Figure 1:
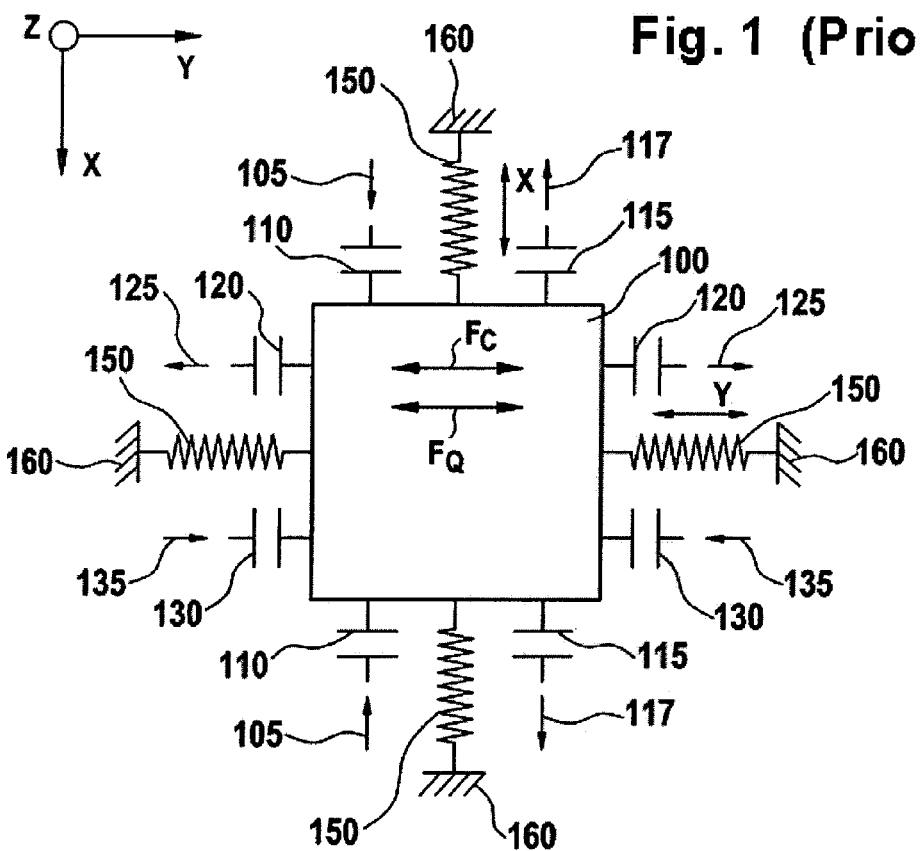
FIG. 1 schematically illustrates a micromechanical functional part of a conventional rotation rate sensor.

FIG. 1 schematically illustrates a micromechanical functional part of a conventional rotation rate sensor. What is illustrated is a seismic mass 100 which is suspended using spring elements 150 on a substrate 160. Spring elements 150 are arranged on seismic mass 100 such that seismic mass 100 is able to execute a driving vibration in a first direction x and a deflection in a second direction y that is perpendicular to it. For the driving of seismic mass 100 in the first direction x, driving devices 110 are provided. These driving devices 110 may be arranged capacitively, for example. Therefore, they are illustrated schematically as capacitors. A drive signal 105 is supplied to driving device 110. On seismic mass 100, additional drive measuring devices 115 are provided, which measure the deflection of seismic mass 100 in first direction x, and generate from it a drive vibration signal 117. Drive measuring devices 115, in this example, are also arranged to be capacitive, and are symbolically illustrated as a capacitor structure. Furthermore, on seismic mass 100, measuring devices 120 are provided for measuring the deflection in second direction y. In the case of vibration gyrometers, the Coriolis effect is used for the determination of an external rotation rate. The Coriolis force that is proportional to the speed that comes about, $F_c = 2mvx\Omega$ acts in second direction y, where v points in direction x, as a result of the drive vibration, and the vector of the rotational speed, or rotation rate $\Omega$, points perpendicular to plane (x, y) in direction z. Thus, Coriolis force $F_c$ effects a measurement deflection of seismic mass 100 in the y direction. Because of imperfections in the micromechanical sensor element, there is also created a path-proportional interference deflection, the so-called quadrature, at the resonance frequency of the drive vibration. This interference deflection of seismic mass 100 is created as a result of a force $F_Q$ and is phase-shifted by 90° from the measuring deviation as a result of speed-proportional Coriolis force $F_c$. The total deflection in second direction y is a superposition of the measurement deflection and the interference deflection. It is measured at measuring devices 120 and converted to a deflection signal 125. In this instance, measuring devices 120 are also arranged to be capacitive, and are illustrated symbolically as a capacitor structure. The quadrature or interference deflection is able to have different directions. However, what is decisive is what proportion exists in second direction y, because the detection devices evaluate deflections in exactly this direction. For the suppression of the interference deflection, as described in German Published Patent Application No. 102 37 411, compensation devices 130 are provided, which intervene at seismic mass 100. Compensation devices are also arranged to be capacitive and are symbolically illustrated as a capacitor structure.

Figure 2:
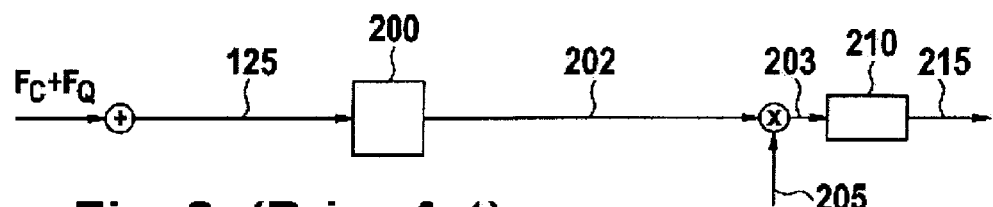
FIG. 2 schematically illustrates an evaluation circuit of a conventional rotation rate sensor.

FIG. 2 schematically illustrates an evaluation circuit of a conventional rotation rate sensor. The deflection of seismic mass 100 in second direction y is recorded by measuring device 120, and a deflection signal 125 is generated from it. Deflection signal 125 represents the same deflection, that is, the proportions of the measurement deflection which originate from the effect of a Coriolis force $F_c$, and the proportions of the interference deflection that stem from quadrature $F_Q$.

The measurement deflection resulting from Coriolis force $F_c = 2mvx\Omega$ is a signal having the frequency of the drive vibration, and is proportional to the speed of seismic mass 100 in first direction x, that is, the drive direction. Thus, the measurement deflection is phase-shifted by 90° from the deflection of the drive vibration. Because of imperfections in the micromechanical sensor element, there is also created an interference signal having the frequency of the drive vibration, namely the quadrature. The interference deflection originating from the quadrature is proportional to the drive deflection, that is, to the path of seismic mass 100 in first direction x that has been covered starting from the midposition of the vibration. Accordingly, the interference deflection is phase-shifted by 90° from the measurement deflection, and in phase or shifted by 180° from the deflection of the drive vibration.

Analog deflection signal 125, in this example, is converted in an input circuit 200, using an analog-digital converter (ADU), to a digital deflection signal 202. Digital deflection signal 202 is synchronously demodulated using a periodic signal 205 having the phase of the measurement deflection and the frequency of the drive vibration. The result is a measured signal 203. Measured signal 203 is supplied to an output circuit 210, where, if necessary, a filtering is performed, and from that, a sensor signal 215 is generated, which includes information on the rotation rate, in the desired form.

The interrelationship set forth above between drive vibration, measurement deflection and interference deflection is used for the suppression of the interference signal.

A synchronous demodulation with speed-proportional periodic signal 215 suppresses interference signals and folds the Coriolis signal into the desired useful band set at the sensor output via filters. Disadvantages of this type of interference suppression may be seen in the high requirements on the absolute phase accuracy and the phase noise of the demodulation signal, and the high dynamic range required in the signal processing. Large interference signals have to be processed in the signal path up to demodulation.

Figure 3:
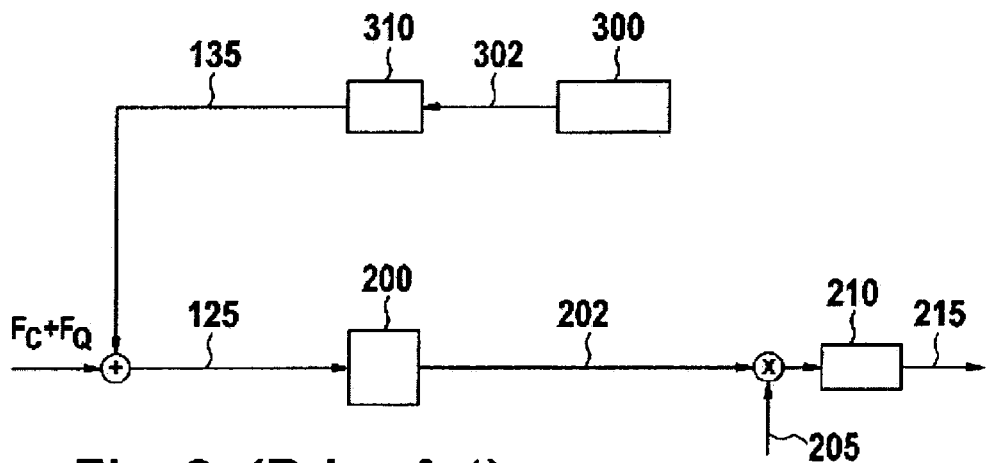
FIG. 3 schematically illustrates an evaluation circuit of a conventional rotation rate sensor having compensation of the interference deflection.

FIG. 3 schematically illustrates an evaluation circuit of a convention rotation rate sensor, having compensation of the interference deflection. Besides the parts already described in FIG. 2, the evaluation circuit has a memory 300, such as a programmable read-only memory (PROM) and a digital-analog converter (DAU) 310. An adjustment value 302 is stored in memory 300, which is supplied to DAU 310. In DAU 310, the adjustment value is converted to a direct voltage, namely a compensation signal 135, which is passed on to compensation devices 130. At this point, then, compensation of the interference deflection takes place. Compensation devices 130 may be self-drive structures or may also utilize other present structures of the sensor, such as driving device(s) or measuring device(s). Such an arrangement, and its manner of operation, is described, for example, in U.S. Pat. No. 6,067,858. Using this evaluation circuit, with the aid of compensation signal 135, the interference deflection is suppressed by suitable device(s), directly in the sensor element. The adjustment takes place in this instance, for example, via a PROM, whose adjustment value is subsequently converted digital-analog. However, this adjustment may also take place in another suitable form. It may remain as a disadvantage, that, if there is a change in the interference signal, for example, as a result of ageing or drift, it is no longer ideally suppressed by the fixed adjustment value.

Figure 4:
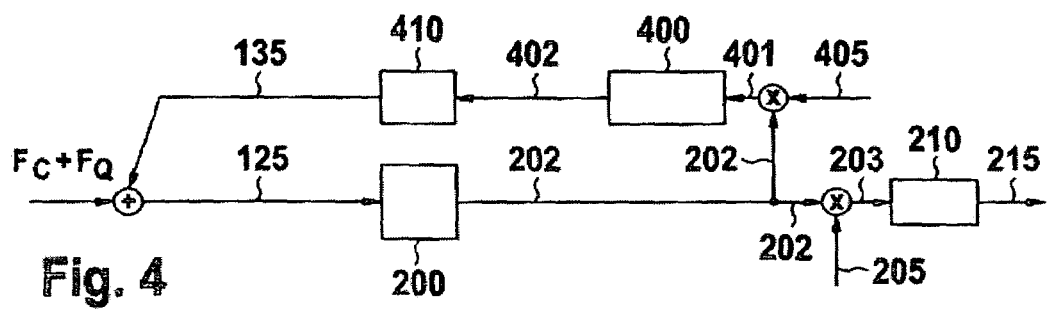
FIG. 4 schematically illustrates an evaluation circuit, according to an example embodiment of the present invention, of a rotation rate sensor.

FIG. 4 schematically illustrates an evaluation circuit, according to an example embodiment of the present invention, of a rotation rate sensor. Besides the parts already described with reference to FIG. 2, the evaluation circuit has a controller 400 and a digital-analog converter (DAU) 410. Digital deflection signal 202 is synchronously demodulated using a periodic signal 205 having the phase of the measurement deflection and the frequency of the drive vibration. Digital deflection signal 202 is also synchronously demodulated in a second signal path, using a periodic signal 405 having the phase of the interference deflection and the frequency of the drive vibration. The result is an interference signal 401 which is supplied to controller 400. Controller 400 generates a control signal 402 which is passed on to DAU 410. The control signal is converted, with the aid of DAU 410, to compensation signal 135, a direct voltage signal, and supplied to compensation device 130. Consequently, the interference deflection of seismic mass 100 is compensated or at least reduced, and deflection signal 125, generated at measuring device 120, receives a lower proportion of interference deflection and a higher proportion of measurement deflection. The control circuit is closed using the conversion of deflection signal 125 in ADU 200, and the making available of digital deflection signal 202. Compared to conventional arrangements, example embodiments of the present invention may provide that the interference suppression, as illustrated in FIG. 4 in the sensor element, does not take place via a control but rather via a regulation. Since the measurement deflection and the interference deflection are phase-shifted from each other by 90°, these signals are able to be separated from each other by synchronous demodulation, in each case having the right phase position. Compensation signal 135 may be a direct voltage that is applied to electrodes in the mechanical sensor element. If a movable electrode, that is fastened to seismic mass 100, sweeps over a fixed second electrode, path-proportional electrostatic forces come about, as described, for example, in German Published Patent Application No. 102 37 411, which counteract the interference signals, and suppress them. If controller 400 is arranged to have an integral-action component, the interference deflection may be suppressed with the exception of quantization-conditioned effects. This so-called quadrature control circuit may also be arranged to be purely analog, which may not have been implemented for reasons of flexibility and based on disadvantages of drift problems in analog circuits.

In an analog arrangement, as described with reference to FIG. 4, there remains a residual error conditioned on quantization, which, in connection with a phase shift during the demodulation of deflection signal 202 using signal 205 leads to an offset in measured signal 203. Changes in time of control signal 402, which are in the useful band range of the output filter of the backend circuit, result in noise at the rotation rate output in response to an erroneous demodulation. The resolution of the DAU should therefore be selected such that the required output noise is not exceeded.

Figure 5:
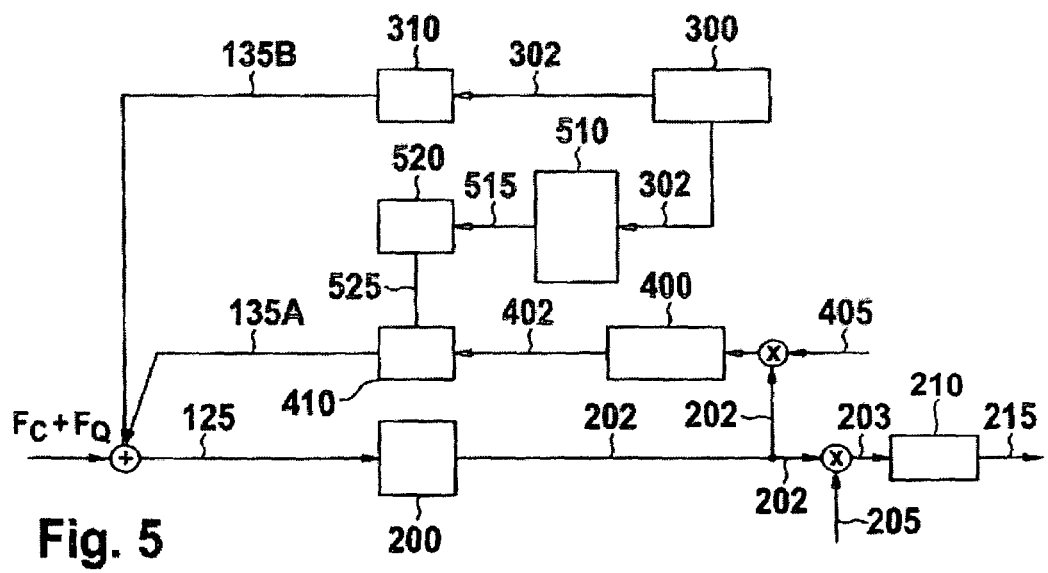
FIG. 5 schematically illustrates an evaluation circuit, according to an example embodiment of the present invention, of a rotation rate sensor.

FIG. 5 schematically illustrates an evaluation circuit, according to an example embodiment of the present invention, of a rotation rate sensor. Micromechanical sensor elements sometimes have great tolerances in the path-proportional interference signals, because of process dispersion due to manufacturing. The requirement on the resolution of controller 400 rises in the same measure as the capture range for interference signal 401 increases at constant requirement on the noise of the overall sensor.

Therefore, according to an example embodiment of the present invention, in a further example embodiment of the evaluation circuit, this problem may be circumvented by combining an interference signal adjustment such as that illustrated in FIG. 3 with a regulation such as that illustrated in FIG. 4. By contrast to that illustrated in FIGS. 3 and 4, the proportion of compensation signal 135 from the control is designated by reference numeral 135B, and the proportion of compensation signal 135 from the regulation is designated by reference numeral 135A.

In this exemplary embodiment, in a first step using the control, the interference deflection is crudely adjusted. Adjustment value 302 is taken from memory 300 and supplied to DAU 310. The DAU generates from it compensation signal 135B which, as a direct voltage, is applied to compensation device 130 in the form of electrode pairs on seismic mass 100. The voltage-force conversion takes place electrostatically via the capacitor structure that comes about because of the fixed electrode on the one side and the movable electrode on the other side.

Figure 6:
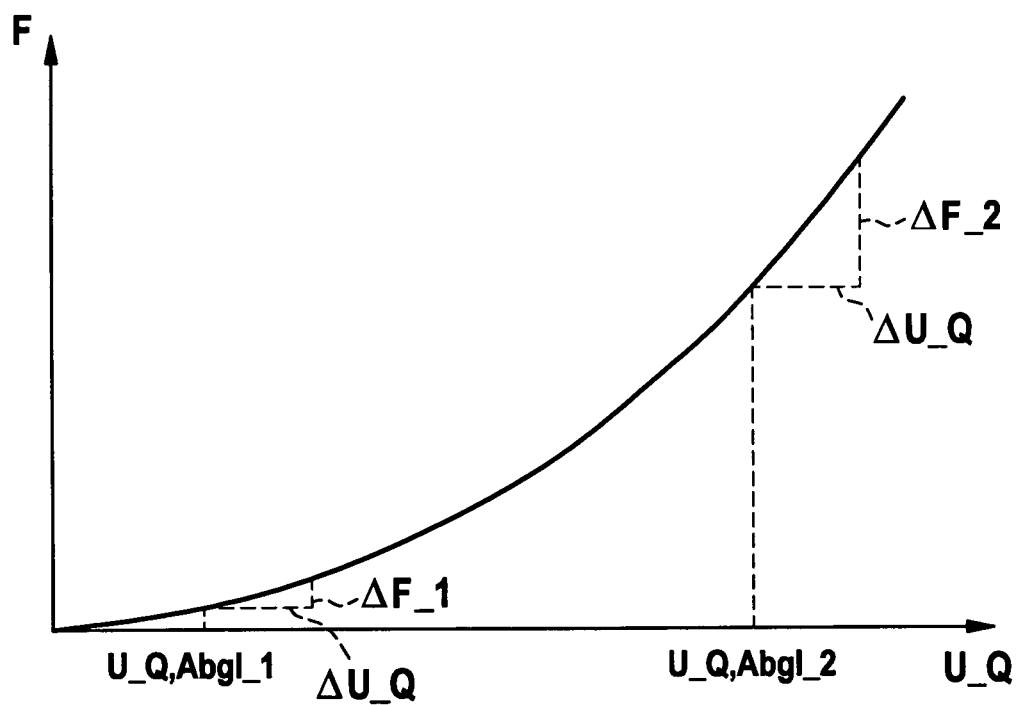
FIG. 6 illustrates a functional interconnection between compensation signal and F, for a rotation rate sensor such as that illustrated in FIG. 5.

FIG. 6 illustrates a functional interconnection between compensation signal and F, for the rotation rate sensor according to an example embodiment of the present invention, as illustrated in FIG. 5. What is illustrated is capture range F plotted against compensation signal 135, which is designated as compensation voltage U_Q. As illustrated, this reveals a quadratically functional relationship. What is also illustrated is a change in capture range $\Delta F$ in response to changes in compensation voltage $\Delta U\_Q$ at two different adjustment points Abgl_1 and Abgl_2. It may be seen in FIG. 6 that, as a function of the adjustment, at various working points, at the same change in $\Delta U\_Q$ of the controller output voltage, significantly different capture ranges $\Delta F\_1$ and $\Delta F\_2$ come about for suppressing the interference signals.

According to example embodiments of the present invention, this effect may be compensated for, using an evaluation circuit such as that illustrated in FIG. 5, in that the capture range of DAU 410 is adjusted depending on the operating point. For this, adjustment value 302, which is available in memory 300, is linked via a stored comparison table 510 to an adjustment-dependent adaptation of the capture range of DAU 410. For this, comparison table 510 supplies an adjustment-dependent digital word or value 515, that is converted in a DAU 520 to an analog value 525. This analog value 525 is then used to define the capture range of DAU 410. Consequently, the regulation, determined by the content of comparison table 510, may have a certain capture range at each operating point or adjustment value 302. For example, the same capture range may always be set in an adjustment-independent manner. Thus, the capture range becomes independent of the functional relationship illustrated in FIG. 6.

By the combination of the adjustment using control and regulation, there is also a reduction in the required capture range of the regulation, and therewith the requirement on the resolution of the DAU 410, without reducing, in this context, the entire capture range for the interference signal that is to be suppressed.

Besides the above, additional exemplary embodiments are possible, which carry out the regulation hereof in various manners, or combine them with conventional design approaches.

What is claimed is:

1. A micromechanical rotation rate sensor, comprising:
a seismic mass;
at least one driving device adapted to effect a driving vibration of the seismic mass in a first direction;

at least one measurement device adapted to measure a deflection of the seismic mass in a second direction and to generate a deflection signal, the deflection including a measurement deflection caused by a Coriolis force and an interference deflection, the interference deflection phase-shifted with respect to the measurement deflection substantially by 90°;

at least one compensation device adapted to decrease the interference deflection and which engages with the seismic mass; and at least one regulation device, the deflection signal supplied to the regulation device as an input variable, the regulation device adapted to demodulate, using a periodic signal having a frequency equal to the driving vibration and a phase equal to that of the interference deflection, an interference deflection signal from the deflection signal and to generate a compensation signal from the interference deflection signal, the compensation signal being supplied to the compensation device.

2. The micromechanical rotation rate sensor according to claim 1, wherein the regulation device is adapted to regulate the interference deflection tending to zero.

3. The micromechanical rotation rate sensor according to claim 1, wherein the regulation device includes an integration element.

4. The micromechanical rotation rate sensor according to claim 1, further comprising a controller adapted to generate an additional compensation signal from an adjustment value.

5. The micromechanical rotation rate sensor according to claim 4, wherein the regulation device is adapted to set a capture range of a digital-to-analog converter unit of the regulation device as a function of the adjustment value.

6. A micromechanical rotation rate sensor, comprising:
a seismic mass;
driving means for effecting a driving vibration of the seismic mass in a first direction;
measuring means for measuring a deflection of the seismic mass in a second direction and for generating a deflection signal, the deflection including a measurement deflection caused by a Coriolis force and an interference deflection, the interference deflection phase-shifted with respect to the measurement deflection substantially by 90°;

compensating means for decreasing the interference deflection and which engage engages with the seismic mass; and regulating means, the deflection signal supplied to the regulating means as an input variable, the regulation means for demodulating, using a periodic signal having a frequency equal to the driving vibration and a phase equal to that of the interference deflection, an interference deflection signal from the deflection signal and for generating a compensation signal from the interference deflection signal, the compensation signal being supplied to the compensating means.

7. The micromechanical rotation rate sensor according to claim 6, wherein the regulation means regulates the interference deflection tending to zero.

8. The micromechanical rotation rate sensor according to claim 6, wherein the regulation means includes an integration element.

9. The micromechanical rotation rate sensor according to claim 6, further comprising: a controller to generate an additional compensation signal from an adjustment value.

10. The micromechanical rotation rate sensor according to claim 9, wherein the regulation means sets a capture range of a digital-to-analog conversion unit of the regulation means as a function of the adjustment value.

11. The micromechanical rotation rate sensor according to claim 6, further comprising: a controller to generate an additional compensation signal from an adjustment value;
wherein the regulation means regulates the interference deflection tending to zero, wherein the regulation means includes an integration element, and wherein the regulation means sets a capture range of a digital-to-analog converter unit of the regulation means as a function of the adjustment value.

12. The micromechanical rotation rate sensor according to claim 1, further comprising: a controller to generate an additional compensation signal from an adjustment value;
wherein the regulation device regulates the interference deflection tending to zero, wherein the regulation device includes an integration element, and wherein the regulation device sets a capture range of a digital-to-analog converter unit of the regulation device as a function of the adjustment value.

* * * * *